(12) United States Patent
Pilch et al.

(10) Patent No.: US 9,700,189 B2
(45) Date of Patent: Jul. 11, 2017

(54) SYSTEM AND METHOD OF RESETTING POWER IN A CLEANING SYSTEM

(71) Applicant: Techtronic Industries Co. Ltd., Tsuen Wan, New Territories (HK)

(72) Inventors: Alan Pilch, Hudson, OH (US); Jamie Horvath, Twinsburg, OH (US)

(73) Assignee: Techtronic Industries Co. Ltd., Tsuen Wan, New Territories (HK)

( * ) Notice: Subject to any disclaimer, the term of this patent is extended or adjusted under 35 U.S.C. 154(b) by 217 days.

(21) Appl. No.: 14/458,019

(22) Filed: Aug. 12, 2014

(65) Prior Publication Data

US 2016/0045090 A1    Feb. 18, 2016

(51) Int. Cl.
| | |
|---|---|
| *H02K 7/14* | (2006.01) |
| *A47L 9/28* | (2006.01) |
| *H02P 6/00* | (2016.01) |
| *A47L 5/30* | (2006.01) |

(52) U.S. Cl.
CPC ........... *A47L 9/2842* (2013.01); *A47L 5/30* (2013.01); *A47L 9/2857* (2013.01); *H02P 6/002* (2013.01)

(58) Field of Classification Search
CPC ...... A47L 5/225; A47L 9/0411; A47L 9/2842; A47L 9/2857; H02P 6/002; H02P 6/20; H02P 6/24
USPC ............ 318/3, 5, 671, 672, 684, 159, 160; 15/332, 334, 339, 347, 351, 361, 372
See application file for complete search history.

(56) References Cited

U.S. PATENT DOCUMENTS

| | | | |
|---|---|---|---|
| 4,905,343 A * | 3/1990 | Jailor | A47L 9/2842 |
| | | | 15/328 |
| 5,907,886 A | 6/1999 | Buscher | |
| 5,920,043 A | 7/1999 | Wang et al. | |
| 6,000,088 A * | 12/1999 | Wright | A47L 5/24 |
| | | | 15/119.2 |
| 6,073,302 A | 6/2000 | Buscher | |
| 6,101,671 A * | 8/2000 | Wright | A47L 5/24 |
| | | | 15/119.2 |
| 6,217,641 B1 | 4/2001 | Gunnarsson | |
| 6,849,108 B2 | 2/2005 | Kent et al. | |
| 7,134,164 B2 * | 11/2006 | Alton | A47L 9/02 |
| | | | 15/331 |
| 7,309,365 B2 | 12/2007 | Yuasa et al. | |
| 7,587,786 B2 * | 9/2009 | Zahuranec | A47L 5/225 |
| | | | 15/329 |

(Continued)

FOREIGN PATENT DOCUMENTS

| | | |
|---|---|---|
| DE | 3434209 | 3/1986 |
| FR | 2416679 | 9/1979 |
| GB | 1494310 | 12/1977 |

*Primary Examiner* — Bentsu Ro
*Assistant Examiner* — Thai Dinh
(74) *Attorney, Agent, or Firm* — Michael Best & Friedrich LLP (57) ABSTRACT

A cleaning system including a body; a motor; a switch; an unit removable from the body; and a power reset device. The switch configured to provide power to the motor upon receiving a first input, and prohibit power to the motor upon receiving a second input. The power reset device configured to prohibit power to the motor upon removal of the removable unit from the body, and provide power to the motor upon replacement of the removable unit onto the body and the switch receiving a third input.

22 Claims, 8 Drawing Sheets

(56) References Cited

U.S. PATENT DOCUMENTS

| | | | |
|---|---|---|---|
| 7,854,038 B2* | 12/2010 | Zahuranec | A47L 5/225 15/334 |
| 7,921,506 B2 | 4/2011 | Baek et al. | |
| 7,926,143 B2* | 4/2011 | Yoo | A47L 5/32 15/319 |
| 8,302,251 B2 | 11/2012 | Beskow et al. | |
| 2007/0094840 A1* | 5/2007 | Zahuranec | A47L 5/225 15/328 |
| 2010/0291853 A1* | 11/2010 | Koshobu | B60H 1/00428 454/155 |
| 2011/0088196 A1* | 4/2011 | Wills | A47L 5/30 15/300.1 |
| 2011/0289720 A1 | 12/2011 | Han et al. | |

* cited by examiner

SYSTEM AND METHOD OF RESETTING POWER IN A CLEANING SYSTEM

BACKGROUND

The invention relates to cleaning systems or devices, such as a vacuum cleaner, including a power reset switch. Cleaning systems include a wide range of products designed to meet a wide variety of cleaning needs. Examples of cleaning systems include stick-type vacuums, lightweight upright vacuums, hand-held vacuums, carpet cleaners, canister vacuums, etc.

Cleaning systems typically have a receptacle, such as a dirt cup or dirt bag. Debris collected by the cleaning device is stored within the receptacle. The receptacle is removable in order for the debris to be disposed of.

SUMMARY

In one embodiment, the invention provides a cleaning system including a body; a motor; a switch; a unit removable from the body; and a power reset device. The switch configured to provide power to the motor upon receiving a first input, and prohibit power to the motor upon receiving a second input. The power reset device configured to prohibit power to the motor upon removal of the unit from the body, and provide power to the motor upon replacement of the unit to the body and the switch receiving a third input.

In another embodiment the invention provides a method of controlling power to a motor of a cleaning device. The cleaning device including a body and a unit removable from the body. The method including providing power to the motor in response to receiving a first input; prohibiting power to the motor in response to removal of the unit from the body; and providing power to the motor in response to replacement of the unit to the body and receiving a second input.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A cleaning system includes a body, a dirt separation system including a motor (e.g., a suction motor), a switch configured to selectively provide power to the motor, and a removable unit such as a dirt receptacle or access panel. For certain applications, it may be useful to discontinue power to the motor when the removable unit is not in position on the body. When the removable unit is installed on or received by the body and upon activation of the switch, power is supplied to the motor. Upon separation of the unit from the body, power is prohibited from the motor. Power is not resupplied to the motor until the unit is returned to the body and the switch is reactivated, such as a door closed, dirt receptacle reinstalled, filter replaced, or other. For convenience, the removable unit is illustrated in the present disclosure as a receptacle; however, as used in the present disclosure and the appended claims the removable unit is any unit separable, openable, or removable from the body such as a dirt receptacle, an air filter, a removable housing, an access panel, a door, the dirt separation system in the form of a hand-held or canister vacuum, or any other unit desired for the application.

FIGS. 1-4 illustrate a cleaning system 100. Although illustrated as a small upright or stick-type vacuum, the cleaning system 100 can be other types of cleaning systems (e.g., upright vacuums, hand-held vacuums, carpet cleaners, canister vacuums, bag vacuums) The cleaning system 100 includes a handle portion 105 and a body portion 110. In some constructions, the handle portion 105 and the body portion 110 are connected via a spine 115.

The handle portion 105 may be removably coupled to the body portion 110. For example, the handle portion 105 may be detachable from the body portion 110 providing a suction force or vacuum through at least a portion of the handle portion as a wand, or may be removable for storage or transport purposes.

In the illustrated embodiment, the body portion 110 includes a battery receptacle 140, a motor/fan assembly 145, a dirt receptacle 150 (e.g., a dirt cup, a dirt bag, etc.), and a plurality of user-controlled inputs (i.e., one or more user-interfaces) 152. In some constructions, the body portion 110 can further include a cyclonic separator. Alternatively, the body portion 110 can further include a disposable bag for dirt collection. In the illustrated embodiment, the battery receptacle 140 receives a power source 155. The battery receptacle 140 includes a plurality of electrical connectors for electrically connecting the power source 155 to the cleaning system 100. Alternatively, the vacuum receives power from a cord connected to an electrical outlet.

The motor/fan assembly 145 includes a suction motor 160 (FIG. 5) and a rotor (i.e., an impeller, a fan, etc.). In some constructions, the suction motor 160 is a brushless direct-current (BLDC) motor operable at multiple speeds, for example, a high-speed and a low-speed. In other constructions, the suction motor 160 can be a variety of other types of motors, including but not limited to, a single speed motor, a variable speed motor, a brush DC motor, a stepper motor, a synchronous motor, or other DC or AC motors.

The receptacle 150 may be positioned below the motor/fan assembly 145, and is removably coupled to the cleaning system 100 (e.g., removably coupled to the spine 115, the body portion 110, the motor/fan assembly 145, etc.). In some constructions, the receptacle 150 and the motor/fan assembly 145 are removably coupled together, and form a single unit when coupled together. In such a construction, the single unit is then removably coupled to the spine 115 and/or the body portion 110. In the illustrated construction, the receptacle 150 is bagless and includes a latching mechanism which secures the receptacle 150 to the cleaning system 100. The receptacle 150 further includes an inlet for receiving refuse. In other constructions, the receptacle 150 includes, or is, a disposable bag for collecting refuse.

Figure 1:
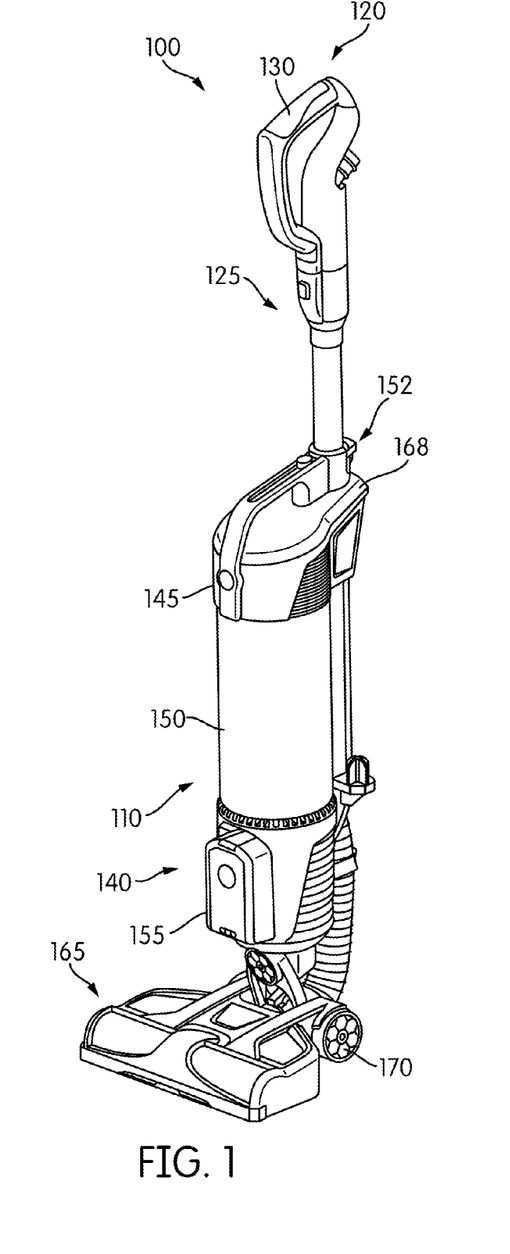
FIG. 1 is a perspective view of one construction of a cleaning system.
Figure 2:
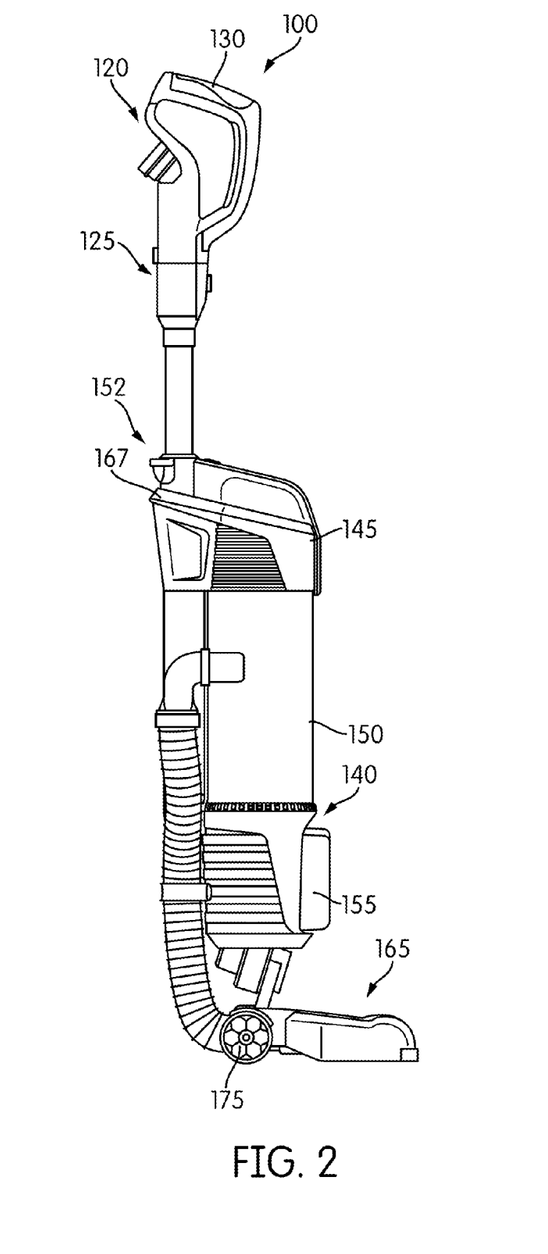
FIG. 2 is a first side view of one construction of a cleaning system.
Figure 3:
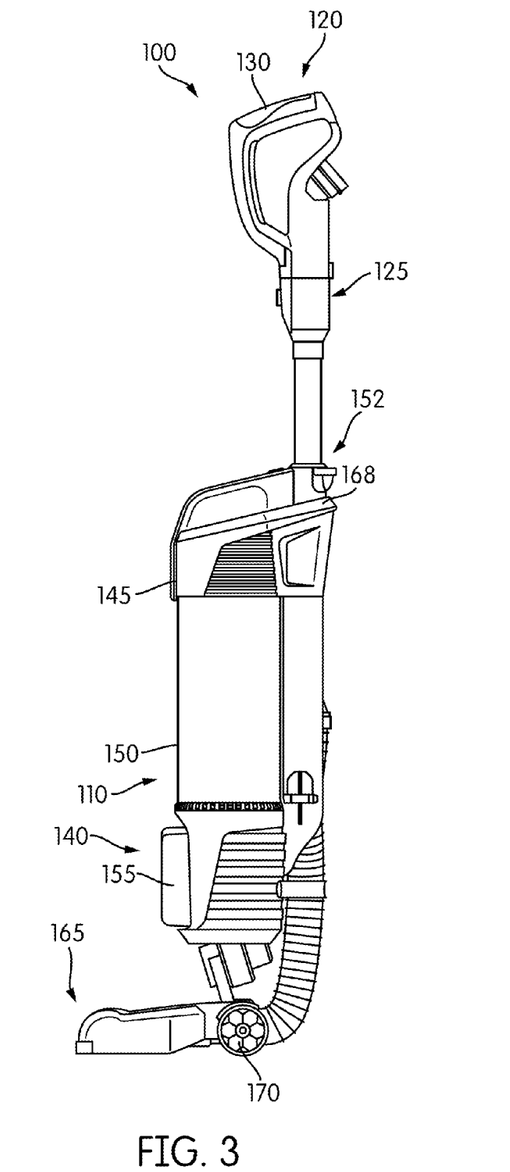
FIG. 3 is a second view of the cleaning system of FIG. 1.
Figure 4:
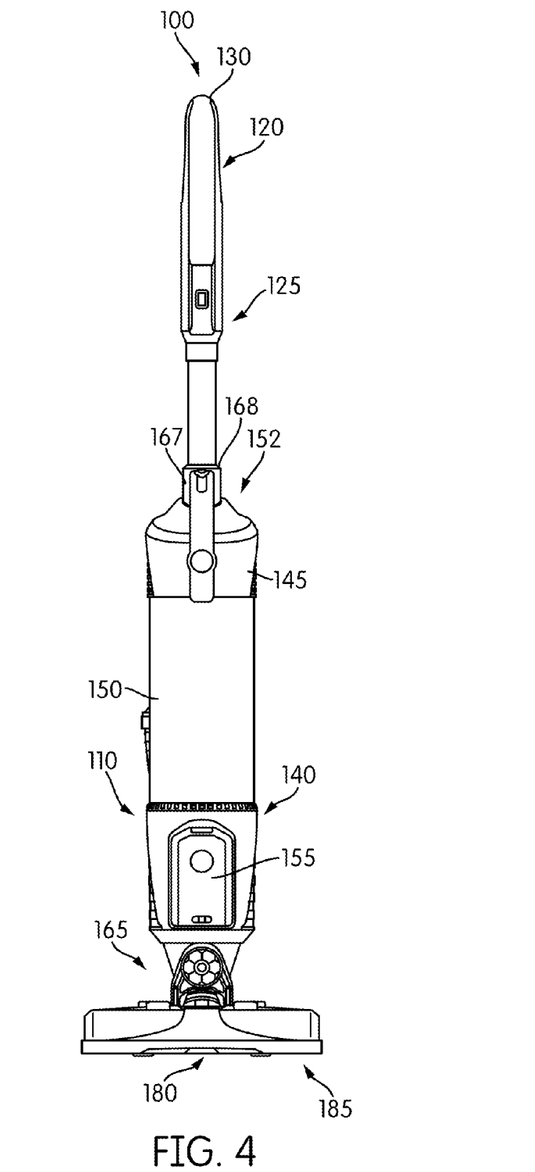
FIG. 4 is a front side view the cleaning system of FIG. 1.
Figure 5:
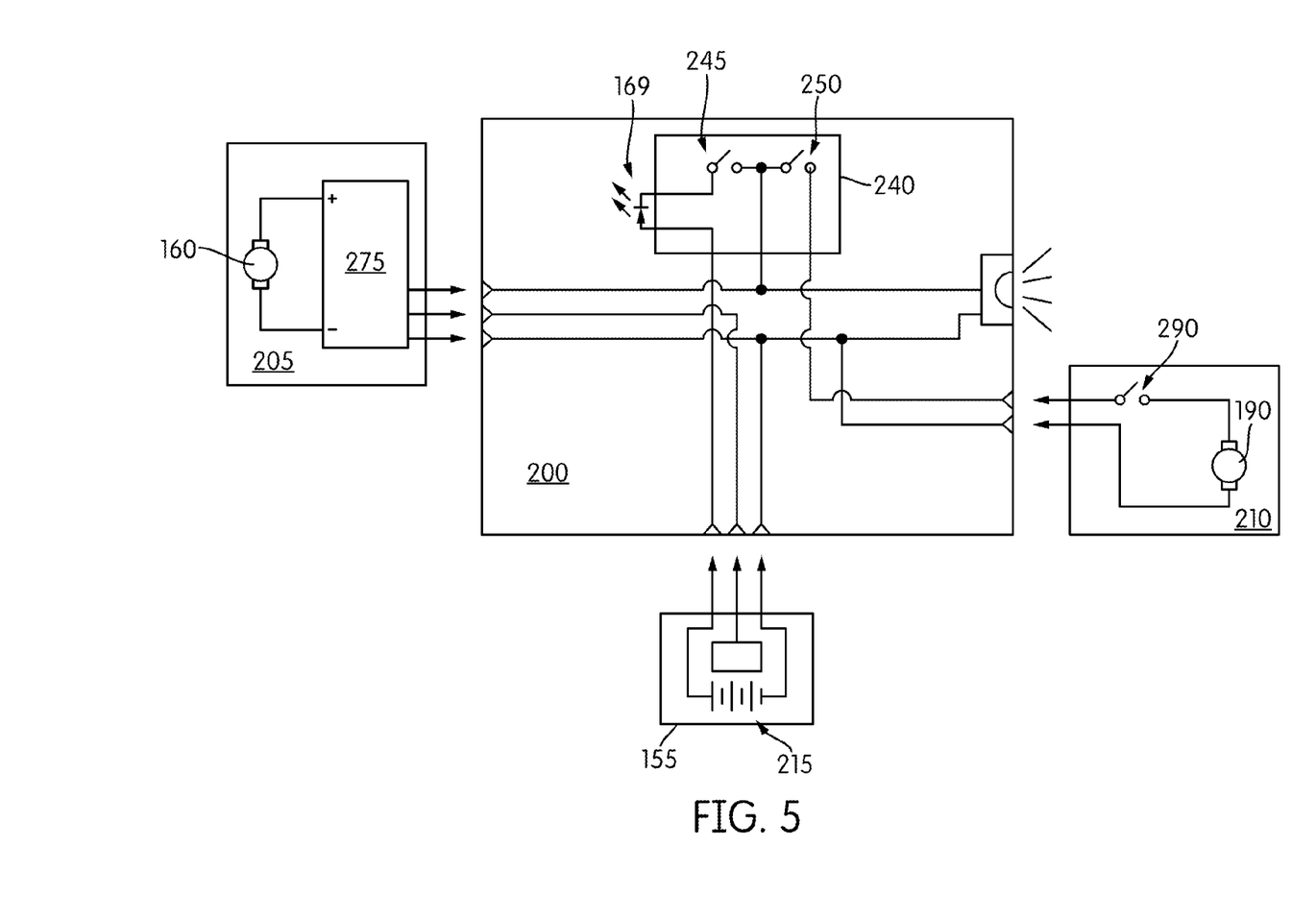
FIG. 5 is a block diagram illustrating one construction of electrical components of the cleaning system of FIG. 1.

The plurality of user-controlled inputs 152 includes a main power user-interface (UI) 167. The main power UI 167 controls power to the cleaning system 100. In some constructions, the main power UI 167 is a two-position push button, being for example, pressed to turn on and pressed again to turn off. In the illustrated embodiment, the UI 167 is a push button that moves between a depressed position and a released position. Alternatively, the user-interface 167 is a toggle, lever, switch, or other user interface as desired. In some constructions, the main power UI 167 includes a main power light-emitting diode (LED) 169 (FIG. 5). In such an embodiment, the main power LED 169 is activated when the main power UI 167 is in the on-position, and thus power is supplied to the cleaning system 100, and deactivated when the main power UI 167 is in the off-position.

In some embodiments, the cleaning system 100 may include a brush-roll engaging the cleaning surface. When a brush-roll is present, the cleaner may include a brush-roll user-interface 168 controlling power to a brush-roll motor 190 (FIG. 5). In some constructions, the brush-roll UI 168 is a two-position push button UI, having for example, an on-position and an off-position. In some constructions, the brush-roll UI 168 includes a brush-roll LED. In such a construction, the brush-roll LED is activated when the brush-roll UI 168 is in the on-position, and thus power is supplied to the brush-roll motor 190, and deactivated when the brush-roll UI 168 is in the off-position. In other constructions, the plurality of user-controlled inputs 152 may be located on the handle portion 105 or any other portion of the cleaner.

A lower end of the body portion 110 includes an interface attaching the body portion 110 to a base portion 165. Although described as three separate portions, the handle portion 105, the body portion 110, and the base portion 165 may be described collectively as the body of the cleaning system 100. The base portion 165 includes a corresponding interface for attaching to the body portion 110. The handle portion 105 and the body portion pivotally move about a first relative to the base portion 165 between an upright storage position and an inclined position.

The base portion 165 includes a first wheel 170, a second wheel 175, a suction inlet 180, and a brush-roll assembly 185. The first and second wheels 170, 175 are coupled to the base portion 165. The suction inlet 180 allows refuse to enter into the cleaning system 100.

The brush-roll assembly 185 includes a brush and the brush-roll motor 190 (FIG. 5). In some constructions, the brush-roll motor 190 is a BLDC motor operable at multiple speeds, for example, a high-speed and a low-speed. In other constructions, the brush-roll motor 190 can be a variety of other types of motors, including but not limited to, a single speed motor, a variable speed motor, a brush DC motor, a stepper motor, a synchronous motor, or other DC or AC motors.

FIG. 5 is a diagram illustrating electrical components of the cleaning system 100. In the illustrated construction, the electrical components of the cleaning system 100 are contained within the power source 155, a main body housing 200, a motor/fan assembly housing 205, and a brush-roll assembly housing 210. In other constructions, the electrical components of the cleaning system 100 are contained within more, less, or different housing.

In the illustrated embodiment, the power source 155 is a battery pack including one or more battery cells 215. In some constructions, the battery cells 215 are rechargeable lithium-ion battery cells. In other constructions, the one or more battery cells 215 may have a chemistry other than lithium-ion, such as but not limited to, nickel cadmium, nickel metal-hydride, etc. Additionally or alternatively, the one or more battery cells 215 may be non-rechargeable battery cells. The one or more battery cells 215 may be electrically connected in a series-type connection, a parallel-type connection, or both a series and parallel type connection.

The power source 155 may further include a battery controller 220. The battery controller 220 includes a processing unit (e.g., a microprocessor, a microcontroller, or another suitable programmable device) and a memory unit. In some constructions, the battery controller 220 is implemented partially or entirely on a semiconductor (e.g., a field-programmable gate array ["FPGA"] semiconductor) chip. In some constructions, the battery controller 220 senses/monitors a variety of characteristics of the battery cells 215, including but not limited to, voltage, current, capacity, resistance, and number of cells. In some constructions, if any of the sensed/monitored characteristics of the battery cells 215 are out of a predetermined range, the battery controller 220 prohibits the power source 155 from outputting current.

The power source 155 selectively couples to main body housing 200 via the battery receptacle 140. The power source 155 selectively couples to the battery receptacle 140 through the use of one or more latching mechanisms. The power source 155 electrically connects to the main body housing 200 through a plurality of terminals. In the illustrated construction, the plurality of terminals include positive battery terminals 225a, 225b, negative battery terminals 230a, 230b, and data serial line, or communications, terminals 235a, 235b. The cleaning system receives power through the positive battery terminals 225a, 225b and is electrically grounded through the negative battery terminals 230a, 230b. The power source 155 outputs data, or serial data, through the communications terminals 235a, 235b.

The main body housing 200 of the cleaning system 100 includes a switch board 240. The switch board 240 selectively controls power from the power source 155 to a variety of electrical components of the cleaning system 100, such as but not limited to electrical components of the motor/fan assembly housing 205 and the brush-roll assembly housing 210. In some constructions, the switch board 240 is operated by the plurality of user-controlled inputs 152 (i.e., the main power UI 167 and the brush-roll UI 168). In such a construction, the main power UI 167 operates a main power switch 245 and the brush-roll UI 168 operates a brush-roll power switch 250. The main power switch 245 selectively provides power from the power source 155 to electrical components within the motor/fan assembly housing 205 and the brush-roll assembly housing 210, while the brush-roll switch 250 selectively provides power from the power source 155 to electrical components within the brush-roll assembly housing 210. In some constructions, the switch board 240 may include more or less components. For example, the switch board 240 may include one or more fuses, one or more positive temperature coefficient (PTO) devices, etc.

The main body housing 200 electrically connects to the motor/fan assembly housing 205. The motor/fan assembly housing 205 includes a speed control module 275 connected to the suction motor 160. The speed control module 275 operates the suction motor 160 at a defined speed. In some constructions, the speed control module 275 is a controller, having a processing unit and a memory unit, that outputs a control signal to the suction motor 160. The control signal operates the suction motor 160 at the defined speed. In some constructions, the motor/fan assembly housing 205 selectively couples to the main body housing 200 via one or more latching mechanisms. In other constructions, the motor/fan assembly housing 205 is permanently affixed to the main body housing 200.

The main body housing 200 further electrically connects to the brush-roll assembly housing 210. The brush-roll assembly housing 210 includes a switch 290 and the brush-roll motor 190. The switch 290 selectively provides power to the brush-roll motor 190. Upon receiving power, the brush-roll motor 190 rotates the brush.

In some constructions, the switch 290 is activated when the cleaning system 100 is in an operation position, such as when the handle portion 105 and the body portion 110 are tilted downward along the first axis at an approximate angle of less than 90°. In such a construction, the switch 290 is deactivated when the cleaning system 100 is in an upright position, such as when the handle portion 105 and the body portion 110 are tilted upward along the first axis at an angle equal to approximately 90°.

Figure 6:
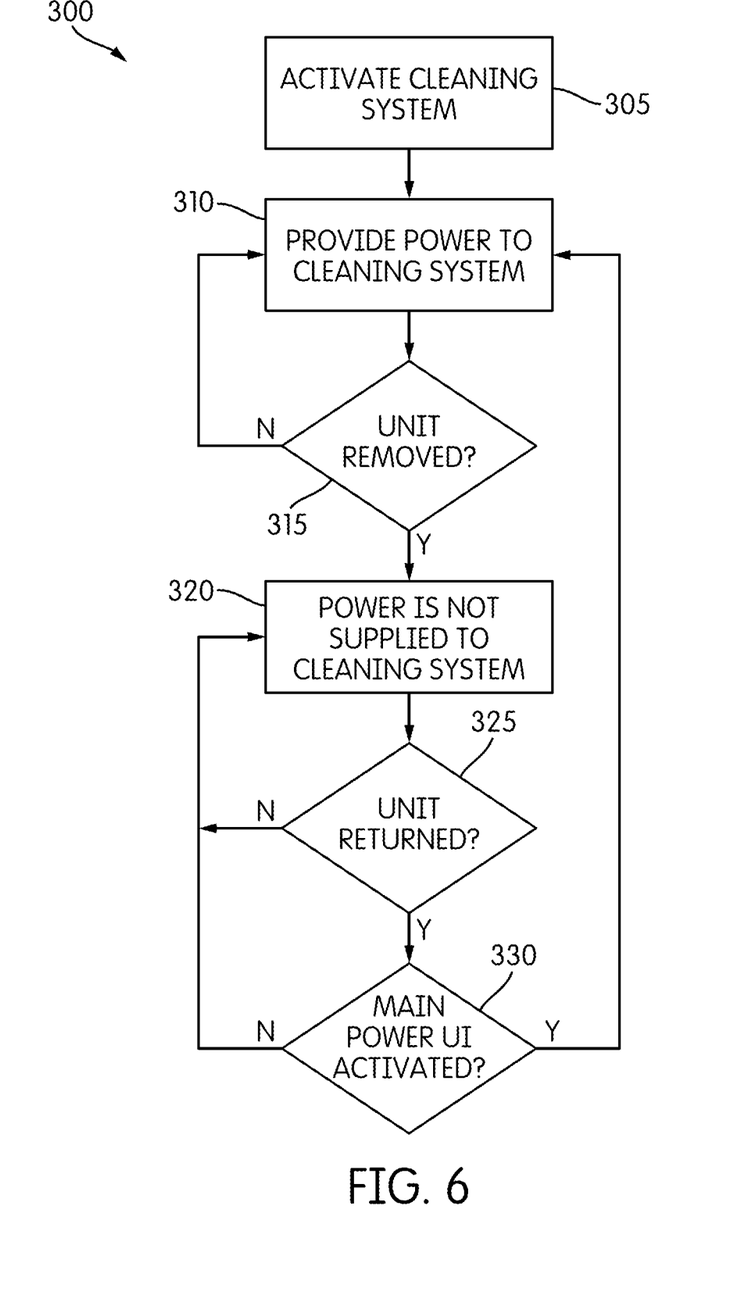
FIG. 6 is a flowchart illustrating an operation of the cleaning system of FIG. 1.

FIG. 6 is a flow chart illustrating a process or method 300 of operation of the cleaning system 100. The cleaning system 100 is activated via the main power UI 167 (Step 305). Power is provided to the cleaning system 100 (Step 310). A determination is made as to whether the removable unit, such as the receptacle 150 or other unit has been removed or separated from its position on the body (Step 315). If the removable unit has not been removed, the process 300 reverts back to Step 310. If the removable unit has been removed, power is not supplied to the cleaning system 100 (Step 320). A determination is made as to whether the removable unit has been returned (Step 325). If the removable unit has not been returned, the process 300 reverts back to Step 320. If the removable unit has been returned, a determination is made as to whether the main power UI 167 has been reactivated (Step 330). If the main power UI 167 has not been activated, the process 300 reverts back to Step 320. If the main power UI 167 has been activated, the process 300 reverts back to Step 310 and power is once again provided to the cleaning system 100. In one embodiment, the determination as to whether the removable unit is in its desired position or not can be made by determining whether the main power switch 245 is opened or closed as discussed below with reference to FIGS. 7A, 7B, and 8. In alternative embodiments, the determination as to whether the removable unit is in its desired position or not can be made using sensors as discussed below with reference to FIG. 9.

Figure 7A:
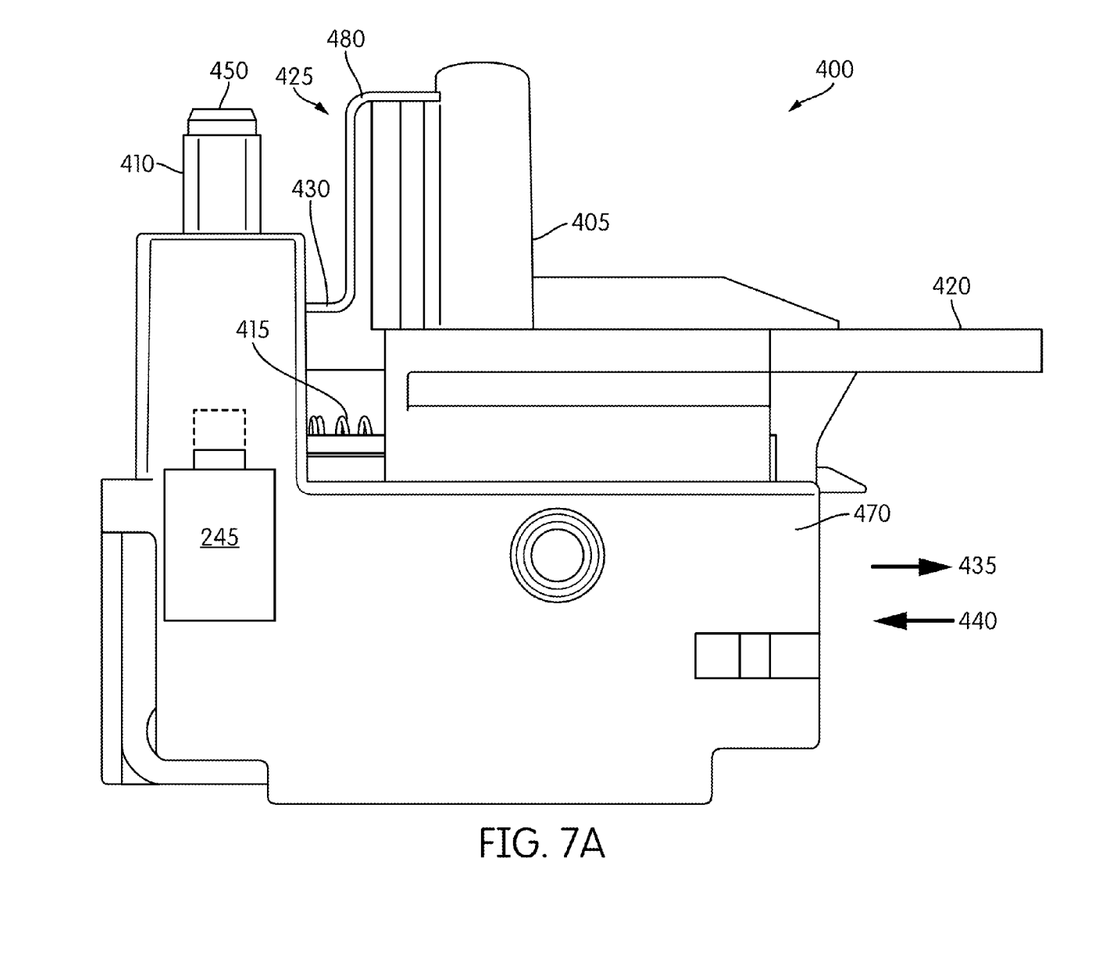
FIG. 7A is a side view of a power reset device of the cleaning system of FIG. 1.
Figure 7B:
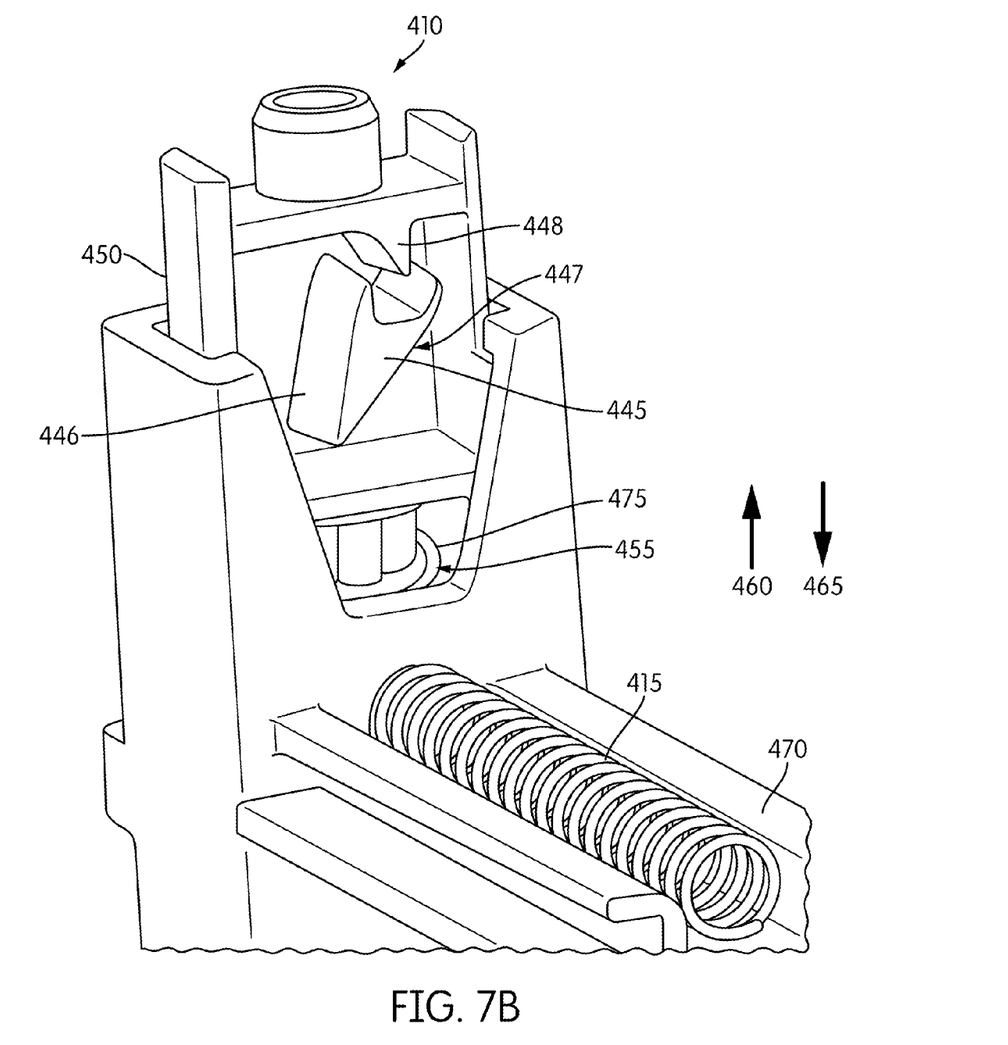
FIG. 7B is a perspective view of a portion of the power reset device of FIG. 7A.

FIGS. 7A and 7B illustrate one construction of a power reset device 400 of the cleaning system 100 for accomplishing the process or method 300. The power reset device 400 includes a power reset actuator 405 and a plunger 410. The power reset actuator 405 has a first actuator end 420 and a second actuator end 425, and the actuator 405 is movable toward and away from the plunger 410 along a support member 470 between a first horizontal position and a second horizontal position. The first actuator end 420 is configured to interact with the removable unit, such as the receptacle 150. The second actuator end 425 includes a pin 430 movable in a direction transverse to the direction of travel of the actuator 405 and spring-loaded or urged toward a home position along a center line 510. In some constructions, the pin 430 is a metal or similar material. The power reset actuator 405 is biased in a first horizontal direction 435 along the support member 470 away from the plunger 410, the first horizontal direction 435 opposite a second horizontal direction 440. In some constructions, the power reset actuator 405 is biased in the first horizontal direction 435 via a spring 415. As used in the present disclosure and the appended claims, "biased" means that a force is applied urging, or forcing, in a desired direction. As used in the present disclosure and the appended claims, directions "horizontal" and "vertical" are with reference to the support member 470, where "horizontal" is along the support member 470 and "vertical" is transverse to the horizontal direction.

The user interface 167 actuates the plunger 410, which is moveable between a first vertical position, discussed with reference to FIG. 8 as first vertical position 485, and a second vertical position 490. The plunger 410 includes a guide path projection 445, a first plunger end 450, and a second plunger end 455. The guide path projection 445 includes a first side 446, a second side 447, and a top portion 448. The guide path projection 445 interacts with the pin 430 of the power reset actuator 405. In some constructions, the guide path projection 445 is molded integrally with the plunger 410. The first plunger end 450 interacts and is in contact with the main power user-interface 167 such that when the user operates the user-interface 167 the plunger 410 is depressed in a vertical direction 465 toward the main power switch 245. The second plunger end 455 interacts and is operable to be in contact with the main power switch 245 when the plunger 410 is depressed. When the second plunger end 455 interacts with the main power switch 245, the main power switch 245 is activated. In the illustrated embodiment, the UI 167 is a button, and the user pressing on the button also depresses the plunger 410 to make contact with the switch 245. The plunger 410 is biased in a first vertical direction 460, the first vertical direction 460 opposite the second vertical direction 465, such that the plunger 410 moves in the first vertical direction 460, deactivating the main power switch 245, when the plunger 410 is released. In some constructions, the plunger 410 is biased in the first vertical direction 460 via a spring 475.

When biased in the first vertical direction 460, the second plunger end 455 of the plunger 410 is not in contact with the main power switch 245, thus the main power switch 245 is in the off-position. When moved in the second vertical direction 465 by activation of the UI 167 by the user, the plunger 410 comes into contact with the main power switch 245, and the pin 430 holds the plunger 410 in contact with the main power switch 245 thus holding the main power switch 245 in the on-position.

In one construction of operation, when the removable unit is coupled to the cleaning system 100, the removable unit operates the first actuator end 420 and moves the power reset actuator 405 in the second horizontal direction 440 against the force of the spring 415. When moved in the second horizontal direction 440, the pin 430 of the power reset actuator 405 comes into contact with the plunger 410 and interacts with the guide path projection 445. While the removable unit, such as the receptacle 150, is correctly positioned on the body, the removable unit holds the actuator 405 in the second direction 440 such that the pin 430 interacts with the guide path projection 445 of the plunger 410. When the removable unit is separated from the body, the power reset actuator 405, biased in a first horizontal direction 435, moves away from the plunger 410 (toward the first direction 435) and the pin 430 disengages from the plunger 410, thus allowing the biased plunger 410 to move away from the main power switch 245.

Figure 8:
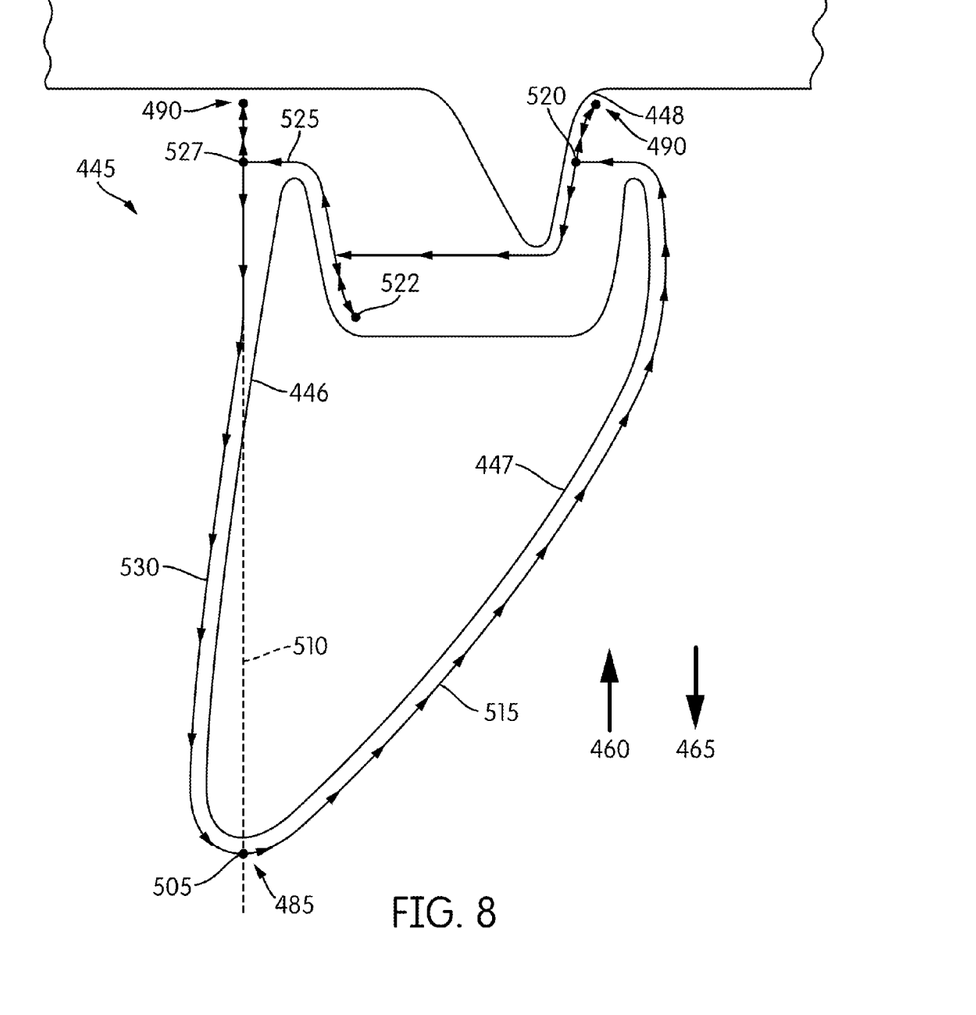
FIG. 8 is a front view of a guide path projection of the power reset device of FIGS. 7A and 7B.

FIG. 8 is a diagram illustrating the interaction of the pin 430 with the guide path projection 445 of the plunger 410. For clarity, the path of the pin 430, with respect to the first side 446, the second side 447, and the top portion 448 of the guide path projection 445, is illustrated as being spaced away from the first side 446, the second side 447, and the top portion 448. However, in actuality, at times the pin 430 may be in direct contact the first side 446, the second side 447, and the top portion 448 of the projection 445 during movement of the plunger 410.

In the illustrated embodiment, the pin 430 remains at approximately the same height from the support member 470, and moves transverse to the direction of movement of the plunger 410 while the plunger 410 moves in engagement with the pin 430. The movement of the guide path projection 445 with the plunger 410 causes the pin 430 to move transverse to the movement of the plunger 410 as shown in FIG. 8. When the plunger 410 is in the first vertical position 485, or off-position, and the removable unit, such as the receptacle 150, is coupled to the cleaning system 100, the pin 430 is in a first pin position 505 of the guide path projection 445. In the illustrated construction, the first pin position 505 is along the center line 510 at the pin home position. The pin 430 is urged toward the center line 510 by the spring or resilience properties of the selected pin material. Therefore, unless the pin 430 is blocked by a portion of the projection 445, the pin 430 maintains alignment with the center line 520. The center line 510 is through the pin home position and may or may not be along the center line of any other part. In the illustrated construction, the pin 430 is urged toward the center line 510 by its own resilience. However, in other constructions, the pin 430 may be urged toward the center line 520 by a separate spring element. As used in the present disclosure and the appended claims, "urged" means forcing in a desired, or particular, direction.

Upon a user placing the main power UI 167 in the on-position, the plunger 410 is moved toward the second vertical direction 465. When the plunger 410 moves toward the second vertical position at least a portion of the projection 445 passes by the pin 430, thereby directing the pin 430 away from the center line 510. Stated another way, as the plunger 410 moves toward the second vertical direction 465, the pin 430 moves laterally away from the center line 510 and traverses along a first path 515 while maintaining contact with the second side 447 of the projection 445. Once the second side 447 passes by the pin 430, the pin 430, urged toward the center line 510, moves to the second pin position 520 in contact with the top portion 448 of the projection 445 until the plunger 410 reaches the second vertical position 490. Therefore, the top portion 448 blocks the pin from alignment with the center line 520.

Once the user discontinues pressing the main power UI 167 toward the second vertical direction 465, the plunger 410, which is biased toward the first vertical direction 465 by the spring 475, moves toward the first vertical direction 465. However, once the pin 430 clears the top portion 448, the pin 430 interacts with the projection 445 moving to a third position 522, blocking any further movement in order to hold the plunger 410 toward the second vertical direction 465. Thus the plunger 410, maintained toward the second vertical direction 465 by the pin 430, holds the main power switch 245 in the on-position.

Upon a user placing the main power UI 167 to the off-position, the plunger 410 is pressed toward the second vertical direction 465 allowing the pin 430 to travel from the third pin position 522 along a second path 525 to a fourth pin position 527. When travelling along the second path 525, once the pin 430 clears the projection 445, the pin 430, urged toward the center line 510, moves toward, and becomes aligned, with the center line 510, and moves along the centerline 510 until the plunger 410 reaches the second vertical position 490.

Once the user discontinues pressing the main power UI 167, the plunger 410, because of the bias, moves toward the first vertical direction 460. As the plunger 410 moves in the first vertical direction 460, the pin 430 travels from the fourth pin position 527, along a third path 530, returning to the first pin position 505 at the plunger first vertical position 485. As the pin 430 travels along the third path 530, the pin 430 comes into contact with the first side 446 of the projection 445. The pin 430 travels along the third path 530 until returning to the first pin position 505. Once the pin 430 has returned to the first pin position 505, the pin 430 is once again aligned with the center line 510. As stated above, when the pin 430 is in the first pin position 505, the plunger 410 is biased toward the first vertical position 460 (e.g., via a spring) and is not in contact with the main power switch 245. Thus, the main power switch 245 is in the off-position (i.e., the cleaning system 100 is off).

Upon removal of the receptacle 150, or other associated removable unit, when the main power UI 167 is in the on-position, the power reset actuator 405 moves toward the first horizontal direction 435 by the force of the spring 415. Movement of the power reset actuator 405 removes the pin 430 from interaction with the guide path projection 445 of the plunger 410. Removal of the pin 430 from the guide path projection 445 enables the plunger 410 to move toward the first vertical direction 460 by the force of the spring 475, thus removing the plunger 410 from contact with the main power switch 245 (i.e., placing the main power switch 245 in the off-position).

In the illustrated embodiment the pin 430 moves in a direction transverse to the direction of travel of the actuator 405 by a pendulum motion. In the embodiment shown in FIG. 7A, the pin 430 is formed as a pendulum attached to an upper portion 480 of the actuator 405. The illustrated pin 430 is urged toward the pin home position by the resiliency of the pin material, such as steel, spring steel, plastic, or other resilient material. In other embodiments, the pin 430 may slide in a slot using springs to move the pin 430 to the home position. While described in the present disclosure and appended claims as a pin, the pin 430 may have other forms, such as a rod, flat spring, ball, or any other shape suitable for the application.

Figure 9:
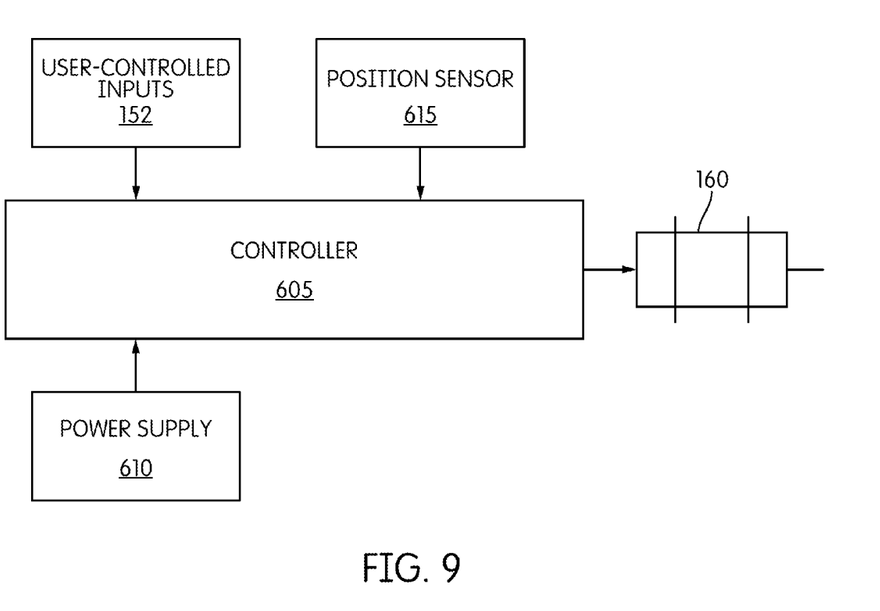
FIG. 9 is a block diagram illustrating another construction of electrical components of the cleaning system of FIG. 1.

FIG. 9 illustrates another construction of electrical components of the cleaning system 100 for accomplishing the power reset process or method 300. The control system 600 includes a controller 605. In some constructions, the controller 605 is, or has a similar construction to, the speed control module 275. The controller 605 receives power from the power supply 610 and operates the suction motor 160 and/or the brush-roll motor 190. In some constructions, the power supply 610 is the power source 155.

In the embodiment of FIG. 9, the controller 605 is in communication with the user-controlled inputs 152 (e.g., the main power UI 167) and a position sensor 615. In some constructions, the position sensor 615 senses if the removable unit, such as the receptacle 150, is coupled to the cleaning system 100. In some constructions, the position sensor 615 is a magnetic sensor operable to detect a magnet in the receptacle 150 and/or other unit.

In one example of operation, upon activation of the main power UI 167, the controller 605 operates the suction motor 160 and/or the brush-roll motor 190. Upon removal of the removable unit, such as the receptacle 150, the position sensor 615 sends a signal to the controller 605. Upon receiving the signal, the controller 605 deactivates the suction motor 160 and/or the brush-roll motor 190. The suction motor 160 and/or the brush-roll motor 190 will not re-activate until the position sensor 615 senses that the receptacle 150 has been returned to the cleaning system 100 and the controller 605 receives an activation signal from the main power UI 167. In another construction, the position sensor 615 continually sends a signal to the controller 605 when the receptacle 150 is placed within the cleaning system 100 and upon removal of the receptacle 150, the position sensor 615 does not send a signal.

Thus, the invention provides, among other things, a new and useful power reset switch, such as but not limited to, a power reset switch for a cleaning system. Various features and advantages of the invention are set forth in the following claims.

What is claimed is:

1. A cleaning system comprising:
   a body;
   a motor;
   a switch
      providing power to the motor upon receiving a first input, and
      prohibiting power to the motor upon receiving a second input;
   a unit removable from and replaceable onto the body; and
   a power reset device
      prohibiting power to the motor upon separation of the unit from the body, and
      providing power to the motor upon replacement of the unit onto the body and the switch receiving a third input,
      the power reset device including
         a plunger interacting with the switch and operable by a user-interface, and
         an actuator having a first actuator end operable by the unit and a second actuator end engageable with the plunger.

2. The cleaning system of claim 1, wherein the power reset device prohibits power to the motor by deactivating the switch and provides power to the motor by activating the switch.

3. The cleaning system of claim 1, wherein the switch receives the first input, the second input, and the third input from the user-interface.

4. The cleaning system of claim 1, wherein the unit is a dirt receptacle.

5. The cleaning system of claim 1, further comprising a battery receptacle configured to receive a rechargeable battery and the cleaning device receives power from the rechargeable battery.

6. The cleaning system of claim 1, wherein the first input and the third input are the same.

7. The cleaning system of claim 1, wherein the power reset device includes a sensor operable to sense placement of the unit onto the body.

8. The cleaning system of claim 1, wherein
   the plunger is moveable between a first vertical position and a second vertical position, the plunger including
      a first plunger end operable by the user-interface,
      a second plunger end activating the switch providing power to the motor when the plunger is in the second vertical position, and
      a projection; and
   the actuator moveable between a first horizontal position and a second horizontal position,
      wherein the second actuator end is engageable with the projection when the actuator is in the second horizontal position selectively retaining the plunger in the second vertical position.

9. The cleaning system of claim 8, wherein the plunger is biased toward the first vertical position and the actuator is biased toward the first horizontal position.

10. The cleaning system of claim 8, wherein upon replacement of the unit onto the body, the actuator moves from the first horizontal position to the second horizontal position into engagement with the plunger, and
    upon interaction with the user-interface, the plunger moves from the first vertical position to the second vertical position and retained by the second actuator end.

11. The cleaning system of claim 8, wherein when the plunger is in the second vertical position and the actuator is in the second horizontal position, the second actuator end interacts with the projection to hold the plunger in the second vertical position.

12. The cleaning system of claim 8, where the second actuator end includes a pin moveable transverse to the direction of movement of the plunger, the pin being spring-loaded toward a home position such that movement of the plunger presses the projection against the pin moving the pin in a direction away from its home position.

13. The cleaning system of claim 12, where when the plunger moves to the second vertical position at least a portion of the projection passes by the pin allowing the pin to move in the direction of the home position blocking movement of the projection toward the plunger first vertical position.

14. The cleaning system of claim 12, further comprising a motor switch operable to control power to the second motor, wherein the power reset device is further configured to
    prohibit power to the second motor upon removal of the unit, and
    provide power to the second motor upon replacement of the unit within the body and the user interface receiving one of the first input and a third input.

15. The cleaning system of claim 1, further comprising a second motor.

16. A method of controlling power to a motor of a cleaning device, the cleaning device including a body and a unit removable from and replaceable onto the body, the method comprising:
    providing power to the motor in response to receiving a first input via a plunger;
    sensing removal of the unit from the body via an actuator having a first actuator end operable by the unit and a second actuator end engageable with the plunger;
    prohibiting power to the motor in response to removal of the unit from the body; and
    providing power to the motor in response to replacement of the unit to the body and receiving a second input.

17. The method of claim 16, wherein the first input and the second input are received from a user-interface operating the plunger.

18. The method of claim 16, where
the step of providing power in response to receiving a first input includes holding the plunger activating a switch providing power to the motor,
the step of prohibiting power to the motor includes releasing the plunger deactivating the switch prohibiting power to the motor, and
the step of providing power to the motor in response to replacement of the unit and receiving a second input includes holding the plunger activating the switch providing power to the motor.

19. The method of claim 16, wherein the removal of the unit from the body is magnetically sensed.

20. A cleaning system comprising:
a body;
a unit removable from and replaceable onto the body, the unit including a receptacle releasably coupled to a motor;
a switch
providing power to the motor upon receiving a first input, and
prohibiting power to the motor upon receiving a second input; and
a power reset device providing power to the motor upon replacement of the unit onto the body and the switch receiving a third input, the power reset device including
a plunger interacting with the switch and operable by a user-interface, and
an actuator having a first actuator end operable by the unit and a second actuator end engageable with the plunger.

21. The cleaning system of claim 20, wherein the power reset device prohibits power to the motor by deactivating the switch.

22. The cleaning system of claim 20, wherein the switch receives the first input, the second input, and the third input from a user-interface.

* * * * *